R. A. BRADSHAW.
NUT LOCK.
APPLICATION FILED OCT. 13, 1909.
955,577.
Patented Apr. 19, 1910.
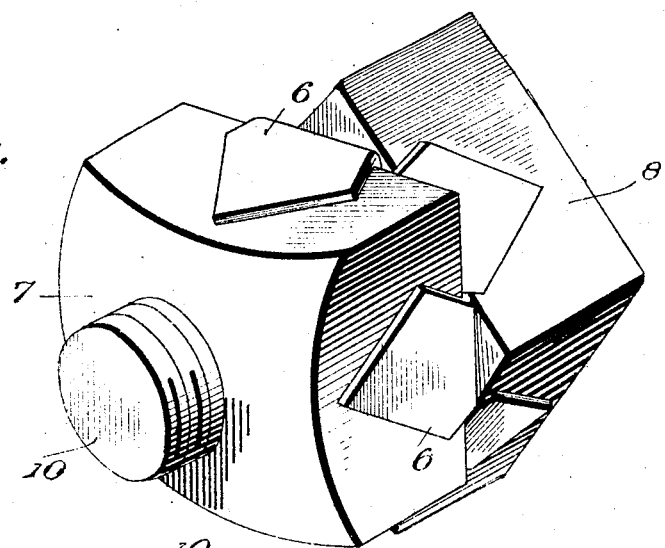
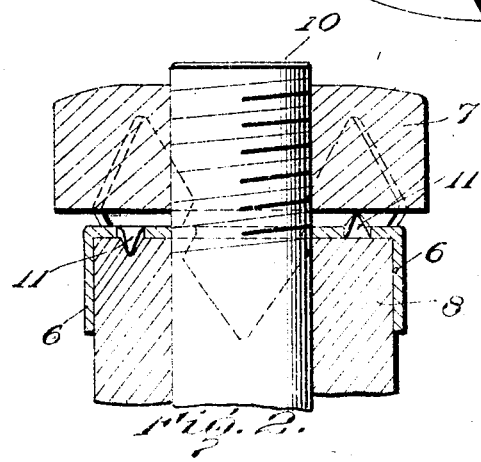
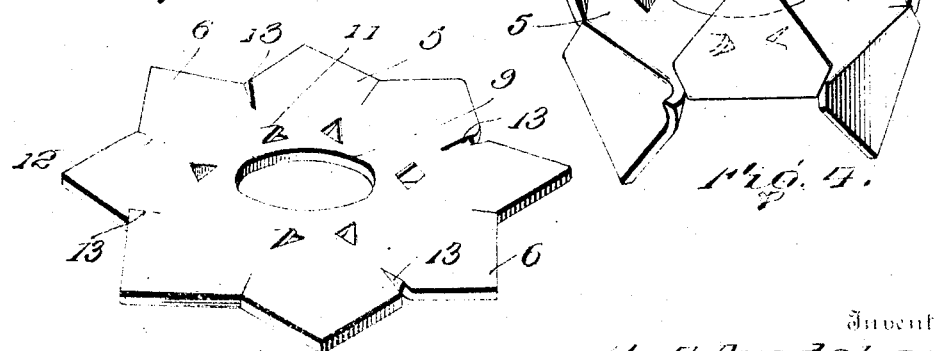
Witnesses
Inventor
H. A. Bradshaw

UNITED STATES PATENT OFFICE.

RICHARD A. BRADSHAW, OF VAN ALSTYNE, TEXAS.

NUT-LOCK.

955,577.  Specification of Letters Patent.  Patented Apr. 19, 1910.

Application filed October 13, 1909. Serial No. 522,479.

*To all whom it may concern:*

Be it known that I, RICHARD A. BRADSHAW, a citizen of the United States, residing at Van Alstyne, in the county of Grayson and State of Texas, have invented certain new and useful Improvements in Nut-Locks, of which the following is a specification.

This invention relates to nut locks and has for its object to provide a comparatively simple and thoroughly efficient device of this character for preventing accidental rotation of nuts on the threaded shanks of securing bolts, incident to excessive jarring, vibration, expansion and contraction or other causes.

A further object is to provide a nut lock comprising a metallic washer having a plurality of radiating ears adapted to be bent into engagement with the nut and object upon which it is supported, thereby to prevent turning movement of one relatively to the other.

A further object is to form the body of the washer with a plurality of yieldable upstruck spurs arranged concentric of the bolt receiving opening and having their pointed terminals disposed in opposite directions for contact with the lower face of the nut and upper face of the object or support respectively, so as to allow for expansion and contraction of the metal, vibration and the like.

A further object is to form a series of radial incisions in the body of the washer at the juncture of the locking ears and to bend the metal at said incisions upwardly to produce yieldable lips adapted to bear against the base of the nut and thus assist in preventing accidental rotation of the latter.

A still further object of the invention is generally to improve this class of devices so as to increase their utility, durability and efficiency.

Further objects and advantages will appear in the following description, it being understood that various changes in form, proportions, and minor details of construction may be resorted to within the scope of the appended claims.

For a full understanding of the invention and the merits thereof and also to acquire a knowledge of the details of construction and the means for effecting the result, reference is to be had to the following description and accompanying drawings, in which:

Figure 1 is a perspective view of a nut lock constructed in accordance with my invention, showing the same in operative position; Fig. 2 is a vertical sectional view of Fig. 1; Fig. 3 is a perspective view of the washer detached and before bending the locking ears into engagement with the nut and support respectively; Fig. 4 is a similar view showing the locking ears bent laterally in opposite directions.

Corresponding and like parts are referred to in the following description and indicated in all the views of the drawings by the same reference characters.

The improved nut lock forming the subject matter of the present invention comprises a metallic plate or washer 5, preferably octagonal in shape as shown, to produce a plurality of radiating locking ears 6 adapted to be bent laterally in opposite directions for engagement with the nut 7 and object upon which it is supported, indicated at 8.

The body of the washer 5 is provided with a centrally disposed opening 9 to permit the passage of the bolt 10, there being a plurality of yieldable up-struck spurs 11 formed in the metal and disposed concentric with the bolt receiving opening 9. The spurs 11 are substantially triangular in shape as shown, while the pointed terminals thereof are disposed in opposite directions for engagement with the lower face of the nut and the upper surface of the support 8 respectively, thus to allow for expansion and contraction of the metal, excessive vibration or the like.

The spurs on the upper face of the washer, by engagement with the upper face of the nut also assist in preventing accidental rotation of the latter on the bolt 10.

Radiating incisions 12 are preferably formed in the washer at the juncture of the locking ears 6 so as to permit the ears to be readily bent into engagement with the nut and support 8. The metal forming the walls of some of the incisions 12, is bent or deflected upwardly to produce yieldable lips 13 which form in effect, ratchet teeth and also serve to assist in preventing rotation of the nut on its securing bolt.

It will here be noted that the spurs 11 are disposed in staggered relation around the bolt receiving opening 9, that is to say, the terminal of one spur extends below the horizontal plane of the bottom of the washer, while the pointed terminal of the next spur extends above the horizontal plane of the upper surface of the washer so that the lower set of spurs lock the washer on the support 8, while the upper set thereof engage the lower face of the nut 7 and tend to bite into the same for the purpose above referred to.

In using the device, the washer is positioned on the support 8 with the bolt passing through the opening 9 therein, after which the nut 7 is adjusted on the threaded end of the bolt to the desired position, the locking ears 6 being subsequently bent laterally in opposite directions into engagement with the adjacent face of the nut and support 8 respectively, as best shown in Figs. 1 and 2 of the drawing.

It will here be noted that by making the washer octagonal in shape, some of the attaching ears 6 are always in position to engage the nut and support 8, thus rendering the device applicable to securing bolts having nuts of different shapes and sizes.

It will of course be understood that the washer may be formed with any number of locking ears 6 and yieldable spurs 11, and that one or more of said locking ears may be bent into engagement with the nut and support respectively, without departing from the spirit of the invention.

The device is extremely simple in construction and will be found admirably adapted for the attainment of the ends in view.

Having thus described the invention, what is claimed as new is:

1. The combination with a support having a threaded bolt extending therethrough, of a nut engaging the threads on the bolt, and a substantially octagonal shaped washer interposed between the nut and support and having its outer edge formed with a plurality of incisions defining radiating locking ears adapted to be bent laterally into engagement with the nut and support respectively, the metal forming the body of the washer being provided with a series of oppositely disposed yieldable up-struck spurs disposed concentric with the bolt receiving opening and adapted to bear against the lower face of the nut and upper face of the support respectively, the metal at some of said incisions being bent upwardly to produce locking lips adapted to engage the lower face of said nut.

2. A nut lock washer comprising a flat polygonal plate having a bolt receiving opening formed therein and provided with a series of radiating incisions spaced from the bolt receiving opening and defining a plurality of locking ears adapted to be bent in opposite directions into engagement with a nut and a support respectively, the metal between the inner ends of the incisions and the bolt receiving opening being formed with yieldable up-struck spurs disposed concentric with the bolt receiving opening and having their pointed terminals extending above and below the washer, and the metal forming the walls of some of the incisions being pressed upwardly to produce yieldable locking lips.

In testimony whereof I affix my signature in presence of two witnesses.

RICHARD A. BRADSHAW. [L. S.]

Witnesses:
J. H. ELLIOTT,
F. M. DOUGLAS.